(12) United States Patent  
Ward

(10) Patent No.: US 7,275,724 B1
(45) Date of Patent: Oct. 2, 2007

(54) LAPTOP COMPUTER SUPPORT PLATFORM

(76) Inventor: Jeffrey N. Ward, 189 Abbey La., Geneva, IL (US) 60134

( * ) Notice: Subject to any disclaimer, the term of this patent is extended or adjusted under 35 U.S.C. 154(b) by 141 days.

(21) Appl. No.: 10/854,387

(22) Filed: May 26, 2004

(51) Int. Cl.
*B43L 15/00* (2006.01)
*A47B 23/00* (2006.01)
*G06F 1/20* (2006.01)

(52) U.S. Cl. .............. 248/118.5; 248/346.01; 248/346.05; 248/917; 248/444; 108/43; 428/216; 361/687

(58) Field of Classification Search ........ 248/346.01, 248/346.05, 917, 444, 118.1, 118, 118.5, 248/188.3, 451; 108/43, 44, 49; 361/679–687; 52/263; 428/216, 458, 462
See application file for complete search history.

(56) References Cited

U.S. PATENT DOCUMENTS

| | | | |
|---|---|---|---|
| 4,052,944 A * | 10/1977 | Jennings | 108/43 |
| 5,005,702 A | 4/1991 | Davis et al. | |
| 5,022,170 A * | 6/1991 | House | 40/358 |
| 5,038,688 A * | 8/1991 | Permenter | 108/43 |
| 5,143,341 A | 9/1992 | Juster | |
| 5,386,964 A * | 2/1995 | Mayo | 248/346.01 |
| 5,535,975 A | 7/1996 | Scott | |
| 5,611,098 A | 3/1997 | Skibik | |
| 5,623,869 A | 4/1997 | Moss et al. | |
| 5,696,536 A * | 12/1997 | Murphy | 345/163 |
| 5,732,849 A * | 3/1998 | Brooks | 220/603 |
| 5,782,450 A * | 7/1998 | Spencer | 248/346.07 |
| 5,937,765 A | 8/1999 | Stirling | |
| 6,131,862 A * | 10/2000 | Gruenenfelder | 248/118 |
| 6,187,398 B1 * | 2/2001 | Eldridge | 428/35.2 |
| 6,193,118 B1 | 2/2001 | Kearl | |
| 6,446,928 B1 * | 9/2002 | Oliver | 248/346.01 |
| 6,568,650 B2 | 5/2003 | Helmetsie et al. | |
| 6,672,557 B1 * | 1/2004 | Jackson | 248/451 |
| 6,682,040 B1 | 1/2004 | MacEachern | |
| 6,749,158 B2 | 6/2004 | Timm | |
| 7,161,799 B2 * | 1/2007 | Lim et al. | 361/683 |
| 2002/0148933 A1 * | 10/2002 | Lin | 248/118 |
| 2005/0264992 A1 * | 12/2005 | Eriksson | 361/687 |
| 2005/0276006 A1 * | 12/2005 | Lim et al. | 361/683 |

* cited by examiner

*Primary Examiner*—Kimberly T. Wood
(74) *Attorney, Agent, or Firm*—John W. Harbst

(57) ABSTRACT

A laptop computer support platform including a rigid, multilayered assembly with a thermal insulator disposed between a generally planar upper side and a lower side defined by the assembly for reducing heat transference from a computer adapted to be supported on the upper side of the assembly.

19 Claims, 3 Drawing Sheets

LAPTOP COMPUTER SUPPORT PLATFORM

FIELD OF THE INVENTION

The present invention generally relates to laptop and/or notebook type computers and, more particularly, to a multilayered laptop computer support platform which inhibits transference of heat between upper and lower surfaces of the platform.

BACKGROUND OF THE INVENTION

When a laptop or notebook computer is initially switched on, the operating temperature of the computer is typically near room temperature. As the laptop computer continues to operate, however, the operating temperature rises. Most newer laptop or notebook computers have some fan technology for dissipating computer heat buildup. Sometime during operation of the laptop computer, a fan begins to operate and the temperature rise of the computer is slowed. In prolonged sessions, however, people have noticed laptop computer temperatures continue to rise.

As will be appreciated, laptop computers having faster processors tend to run at temperatures which are elevated in comparison to other computers. Moreover, research has shown newer laptop computers with increased memory, processor and video features often run at temperatures which are elevated as compared to other computers. Additionally running certain kinds of software programs, like intense video games or video editing, over extended time periods generally increases the operating temperature of the laptop computer. In short, laptop computer operating temperatures typically can range from about 10° to about 140°; temperatures which are hot enough to cause sever burns to a person's skin.

During use of a laptop computer, everyone likes to sit a little differently. Some people like having their laptop computer sitting flat on their laps while others prefer having the laptop computer tilted one way or the other. One of the problems with laptop computers, however, is that they simply slide around if they are held at any angle other than flat. Accordingly, and to inhibit sliding movements thereof, a bottom side of the laptop computer is usually held flat against the lap of the user.

Most laptop or notebook computers dissipate heat through a bottom side thereof. Accordingly, if the laptop computer is used for extended periods of time in non-desk situations, the person using the laptop computer may be forced to position themselves into uncomfortable positions. By forcing a person to repetitively position their body to work in unnatural positions, i.e., causing the person using the laptop to fold their legs under the laptop computer or bracing the laptop computer with a person's body, can cause physical injury or harm.

The majority of known laptop computer pads simply fail to provide meaningful protection against heat transference between the bottom of the laptop computer and the skin of the person having the laptop computer situated on their laps. Moreover, and besides failing to offer meaningful protection against heat transference, such known lap top computer support pads only serve to trap heat between such support pad and the person's skin. Thus, prolonged operation of the computer on a person's lap is often times impractical.

Additionally, one of the preeminent reasons people purchase laptop computers is such that they can take it with them wherever they go. That is, portability is an important consideration. In today's fast paced world of travel, any extra weight or bulk is a problem. Although offering rigidity, most known laptop computer stands cannot collapse to a size convenient for travel and are too bulky to fit into conventional laptop computer cases.

Thus, there is a continuing need and desire for a laptop computer support platform which inhibits heat transference therethrough, which is lightweight and yet offers the rigidity required to support a laptop computer, and which is designed to dissipate heat from a bottom side of the laptop computer during extended use thereby prolonging the usefulness of the laptop computer.

SUMMARY OF THE INVENTION

In view of the above, and in accordance with one aspect, there is provided a laptop computer support platform comprised of a rigid, multilayered assembly including a thermal insulator. The thermal insulator is disposed between a generally planar upper side and a lower side of the assembly for reducing heat transference from a computer supported on the upper side of the assembly. In one form, the support platform of the present invention inhibits about 80% to about 95% of the heat directed against the upper side of the platform from being transferred to the lower side of the platform.

To promote portability thereof, the platform support measures only about 0.937 inches to about 1.250 inches in thickness. Accordingly, the platform support of the invention readily fits into the vast majority of laptop computer cases. Moreover, the platform support of the present invention is lightweight. Preferably, weight the platform support of this invention only about 10 ounces to about 15 ounces. In a most preferred form, the platform support of this invention weighs only 11 ounces.

To further improve transference of heat away from the body of the person using the computer, the platform support of the present invention is configured, on a lower or bottom side thereof, with an open channel or chimney for directing air between the lower side of the support platform and the lap of the person using the computer. More specifically, a pair of spaced protrusions define an open channel extending along the lower side of the multilayed assembly for elevating the majority of the contact surface on the lower side of the support platform from the lap of the user thereby increasing the air space under the platform so as to allow air to flow through the channel and thereby promote the dissipation of heat away from the lap of the user.

According to another aspect, there is provided a laptop computer support platform including first and second layers of material with a cover extending beneath the second layer of material and across a bottom of the platform. The first layer of material provides rigidity across an upper generally planar area of the platform. The second layer of material inhibits transference of heat through the computer platform, with the second layer of material being arranged beneath the first layer of material. In a preferred form, the first layer of material acts as a stiffener for the platform and is preferably fabricated from corrugated material to reduce platform weight.

In a preferred form, the laptop computer support platform further includes a translucent material extending across a top or upper side of the platform so as to allow indicia to be revealed therethrough. In one form, the translucent material combines with the first layer of material to define a pocket therebetween. Moreover, the support platform is configured to allow an advertising sheet to be fit within the pocket thereby allowing easy and quick changes to the advertising indicia visible through the translucent material. Alternatively, the translucent material extending across the top or upper side of the platform support can be fabricated from a colored synthetic material to provide the support platform with differing appearances.

In one form, the platform support further includes structure preferably adhered to the upper surface of the platform and projecting upwardly therefrom. Such structure serves to raise one end of the laptop computer from the upper surface of the platform whereby further enhancing the flow of air beneath the computer and across the upper surface of the support.

The cover extending across the bottom of the platform is preferably formed from a woven material. As such, the cover enhances the aesthetic appearance of the platform. Moreover, the woven material for the cover is ribbed to inhibit the platform from shifting on the lap of the user during operation of the computer.

A primary feature of the present invention relates to providing a rigid support platform for a laptop computer which inhibits about 80% to about 95% of the heat generated by the laptop computer from passing between upper and lower sides of the platform Another feature of the present invention relates to a laptop computer platform support which minimizes the effects of heat transference between upper and lower sides of the support and which is configured to channel the flow of air beneath between the computer and the lap of the person using the computer.

Still another feature of the present invention relates to providing a rigid support platform for a laptop computer which weighs less than one pound and is configured to readily fit into most laptop computer carrying cases.

Yet another feature of the present invention relates to providing a laptop computer support which is economical to manufacture and readily adaptable to having different and varying advertising indicia readily viewable from an upper surface thereof.

These and other features, aims, and advantages of the invention will become more readily apparent from the following detailed description, the drawings, and the appended claims.

DETAILED DESCRIPTION OF THE INVENTION

Figure 1:
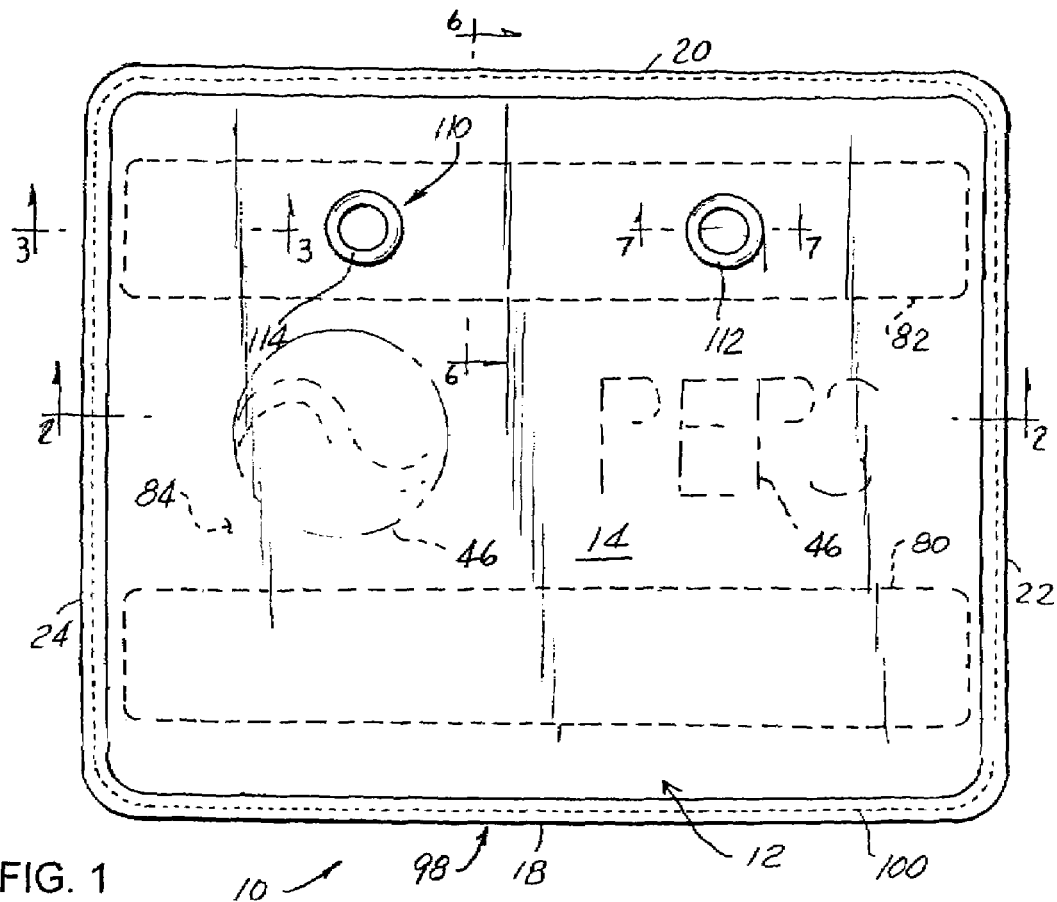
FIG. 1 is a top plan view of the lap top computer support platform of the present invention.

While the present invention is susceptible of embodiment in multiple forms, there is shown in the drawings and will hereinafter be described preferred embodiments of the invention, with the understanding the present disclosure sets forth exemplifications of the invention which are not intended to limit the invention to the specific embodiments illustrated and described.

Figure 2:
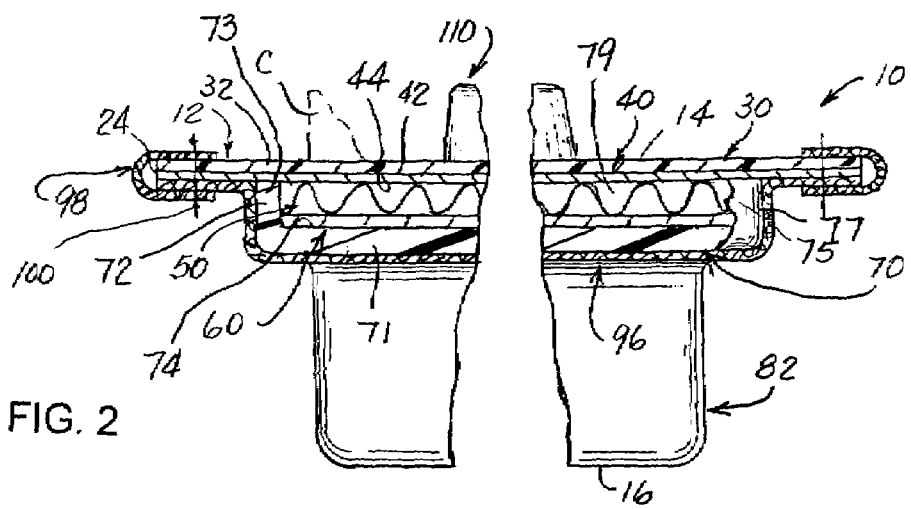
FIG. 2 is an enlarged sectional view taken along line 2-2 of FIG. 1.

Referring now to the drawings, wherein like reference numerals indicate like parts throughout the several views, FIGS. 1 and 2 illustrate a laptop computer platform support, generally indicated by reference numeral 10, embodying principals of the present invention. The platform support 10 of the present invention comprises a multilayered assembly 12 including a planar top or upper side 14 and a lower or bottom side 16 (FIG. 1). In one form, the top or upper side 14 of the multilayered assembly 12 is generally rectangular and is sized to adequately support a conventional lap top computer C (FIG. 2) thereon.

In the form illustrated, the multilayered assembly 12 has generally parallel front and rear edges 18 and 20, respectively, and a pair of generally parallel side edges 22 and 24. The front and rear edges 18 and 20, respectively, of the support platform 10 are separated by a distance of about 12 inches. The side edges 22 and 24 of the support platform 10 are separated by a distance of about 13 inches. To promote portability thereof, the laptop support structure 10 weighs less than one pound. More specifically, the laptop computer platform support 10 weighs between about 10 ounces and about 15 ounces and has a thickness between the upper side 14 and lower side 16 of about 0.937 inches and about 1.312 inches.

As illustrated in FIG. 2, the multilayered assembly 12 includes an upper or top layer 30. The upper layer 30 of assembly 12 is proximately the same size as the distance between edges 16, 18 and 20, 22 of assembly 12. In one form, the upper or top layer 30 of assembly 12 comprises a sheet 32 preferably formed from a flexible and preferably translucent material such as a matted polyethylene or other suitable transparent material ranging in thickness between about 0.027 inches and about 0.035 inches. In a preferred embodiment, the polyethylene sheet 32 ranges in thickness between about 0.030 inches and about 0.35 inches. The polyethylene material forming the top or upper layer 30 of assembly 12 can also be color tinted without detracting or departing from the spirit and scope of the present invention.

Disposed in superposed relation beneath the upper layer 30, assembly 12 includes a printable insert layer 40. In a preferred form, the insert 40 of assembly 12 is proximately the same size as the distance between edges 16, 18 and 20, 22 of assembly 12 and is preferably formed from a material from the class consisting of: a suitable synthetic material, paper, or polyvinyl plastics. In one form, the insert 40 of assembly 12 ranges in thickness between about 0.008 inches and about 0.012 inches. In a preferred embodiment, the insert 40 has a double matted finish on opposed major surfaces 42 and 44 thereof. Before being arranged in operable combination with the platform support 10, suitable indicia 46 (FIG. 1), i.e., in the form of advertising or the like, can be imprinted on the major surface 42 of the insert 40 disposed directly beneath the upper layer 30 of assembly 12 such that when the support 10 is assembled, the indicia 46 shows through the upper layer 30 and is readily visible to the user of the platform support 10 and others. As will be appreciated, one or both of the polyethylene upper or top layer 30 of assembly 12 and/or the major surface 42 of insert layer 40 can be color tinted to provide a unique aesthetic effect for the top or upper side of the platform support 10.

Figure 3:
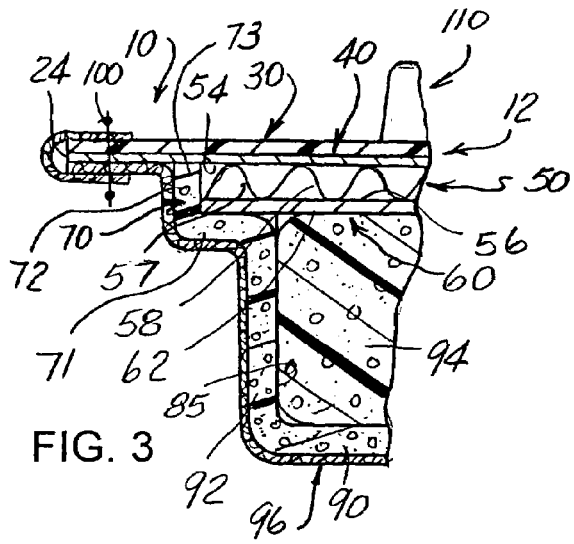
FIG. 3 is an enlarged sectional view taken along line 3-3 of FIG. 1.

As shown in FIGS. 2 and 3, and to provide rigidity to the multilayered assembly 12 of the support platform 10, a stiffener layer 50 is provided in underlying relation relative to the upper layer 30 and insert layer 40. In the illustrated embodiment, the stiffener layer 50 is preferably formed from a corrugated material 52 of the type commonly referred to as corroplast or the like As will be appreciated, the corrugated material 52 preferably includes vertically spaced layers 54 and 56 of generally planar plastic, paper or other suitable non-metallic material secured, as by adhesive or the like, to an intermediary layer of suitable non-metallic material 57. In the illustrated form, the intermediary layer of material 57 is configured with corrugations 58 disposed between the vertically spaced layers 564 and 56. Suffice it to say, the purpose of the stiffener layer 50 is to advantageously provide the support platform 10 with rigidity, while minimizing the weight thereof. Preferably, the stiffener layer 50 has a material thickness ranging between about 0.20 inches and about 0.35 inches. In a most preferred embodiment, the stiffener layer 50 has a material thickness of about 0.24 inches.

In the exemplary embodiment, the stiffener layer 50 is sized such that both the upper layer 30 and insert layer 40 extend horizontally past all four sides of the stiffener layer 50. As such, the platform support 10 is preferably provided with an exposed and somewhat flexible edge extending about all four sides of the platform support 10. Moreover, and as shown in FIG. 1, the multiple corners on the platform support 10 are rounded to inhibit inadvertent damage and injury.

To restrict heat transference, a thermal insulator layer 60 is disposed in underlying relation across the majority of the upper planar surface area defined by the upper side 12 of the multilayered assembly 20. As shown in FIG. 3, the thermoinsulating layer 60 preferably includes an insulating sheet 62 of material commonly referred to as "Thinsulate" insulation. In one form, insulating sheet 62 is proximately the same size as and directly underlies the stiffener layer 50. It is possible, however, without detracting or departing from the spirit and scope of the present invention, to invert layers 50 and 60 such that insulating sheet 62 overlies the stiffener layer 50.

As shown in FIGS. 2 and 3, the multilayered assembly 12 further includes a base 70 for adding further strength and rigidity to the platform support 10. Base 70 further serves to restrict heat transference between the top and bottom sides 14 and 16, respectively, of the platform support 10. Moreover, base 70 serves to maintain the stiffener layer 50 and the thermoinsulating layer 60 in superposed relation relative to each other while also positioning layers 50 and 60 relative to the layers 30 and 40 of the multilayered assembly 12. As shown in FIG. 2, base 70 includes generally horizontal wall structure 71 having generally vertical wall structure 72 integrally formed therewith and projecting upwardly therefrom so as to define an open-top cavity 74. In one form, wall structure 72 includes interconnected and upstanding walls 73, 75, 77 and 79 arranged in a generally rectangular configuration relative to each other. The upper ends of the walls 73, 75, 77 and 79 terminate in generally planar relation relative to each other and serve to support the layers 30 and 40 in a planar fashion thereabove.

In one form, base 70 is rigidly formed from a cross-linked compressible foam material yielding both strength and compressibility to the multilayered assembly 12. In the preferred embodiment, base 70 has a generally constant cross-section ranging between about 0.100 inches and about 0.156 inches thick. In a most preferred form, base 70 has a generally constant cross-section thickness of about 0.125 inches.

Base 70 is configured such that the open-top cavity 74 defined thereby is sized to accommodate and support the stiffener layer 50 and the thermoinsulating layer 60 components of the multilayered assembly 12 therein, in either superposed relation relative to each other. The vertical depth of the cavity 74 equals or is slightly less than the cumulative width of the layered components 50 and 60 of the assembly 12. As such, and when assembled, the stiffener layer 50 and thermoinsulating layer 60 are arranged directly beneath and in supporting relation, along with the wall structure 72 of base 70, relative to about 70% to about 85% of the surface area of the layers 30 and 40 of assembly 12.

Figure 4:
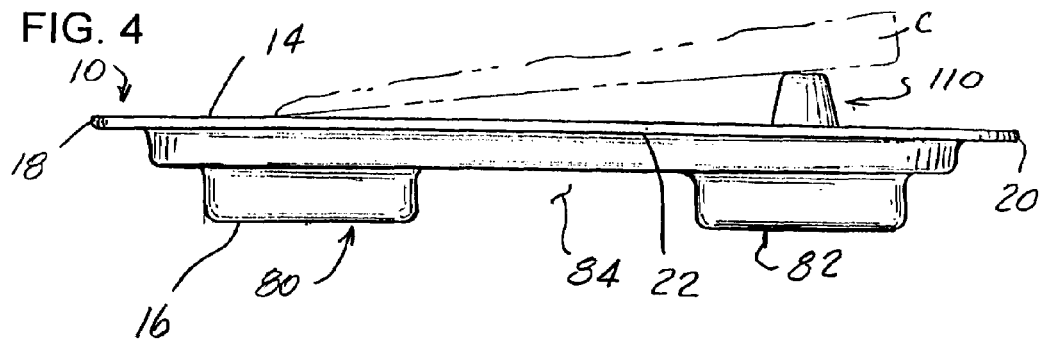
FIG. 4 is a side elevational view of the lap top computer support platform of the present invention.
Figure 5:
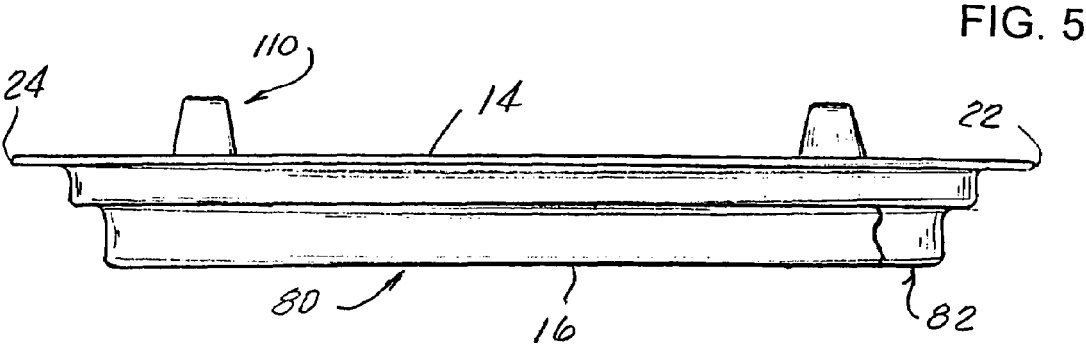
FIG. 5 is a front elevational view of the lap top computer support platform of the present invention.

As shown in FIG. 4, the platform support 10 of the present invention furthermore preferably includes a pair of protrusions or legs 80 and 82 depending from the horizontal wall structure 71 of base 70 (FIG. 2) and extending lengthwise along the lower side 16 of the platform support 10. As shown, the protrusions or legs 80, 82 are spaced in fore-and-aft relation relative to each other and define an open-bottom channel 84 therebetween for promoting free flow of air between the upper and lower sides 14 and 16, respectively, of the platform support 10. As shown in FIG. 5, the protrusions 80, 82 extend generally parallel to each other and generally parallel to the front and rear edges 18 and 20 (FIG. 1), respectively. In the illustrated embodiment, channel 84 opens to the opposed sides 22 and 24 of the platform support 10. Preferably, each leg or protrusion 80, 82 extends for a distance exceeding 80% of the distance between and preferably nearly the full distance between the side edges 22, 24 of the platform support 10.

Figure 6:
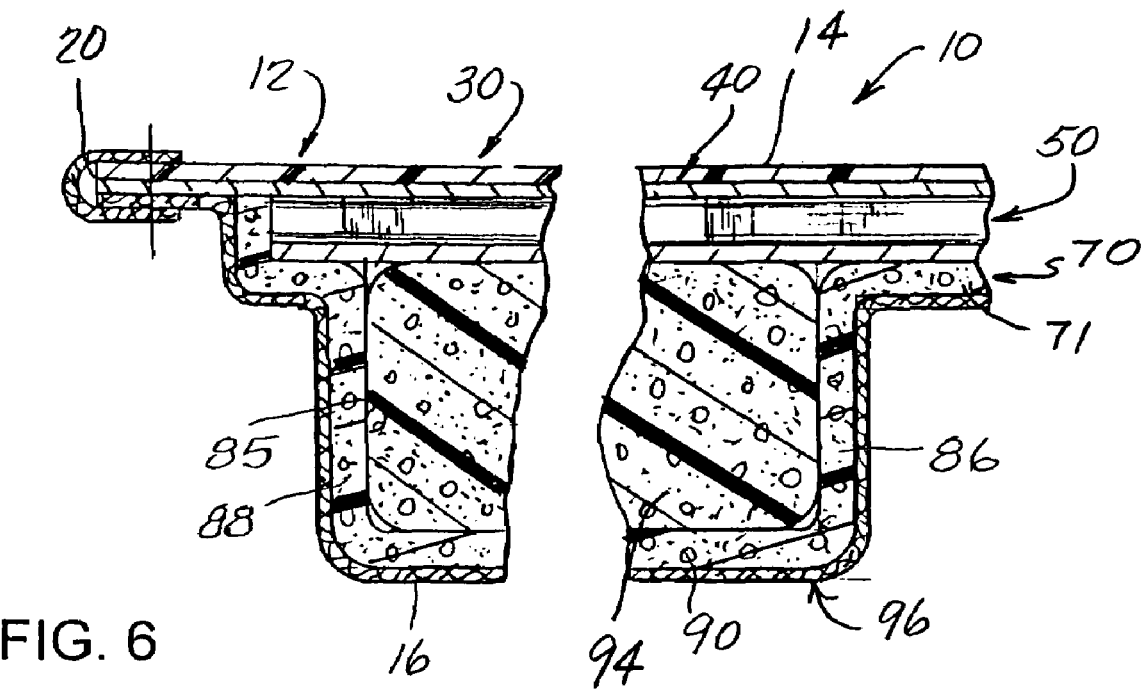
FIG. 6 is an enlarged sectional view taken along line 6-6 of FIG. 1.

In the illustrated form, the legs or protrusions 80,82 extending lengthwise along the lower side 16 of the platform support 10 are substantially identical to each other. Accordingly, only the details of protrusion 80 will be discussed with the understanding protrusion 82 is similarly formed. As shown in FIGS. 3 and 6, the generally horizontal wall structure 71 of base 70 is formed with an open-top trough or channel 85 for each protrusion 80, 82. As shown in FIG. 6, for each protrusion 80, 82, the cross-linked compressible foam material of base 70 is formed with a pair of generally parallel walls 86 and 88 which, in the illustrated embodiment, depend from and are integrally formed with the base 70. Moreover, the generally parallel walls 86, and 88 of each protrusion are inwardly spaced from the adjacent front or rear edge of the platform support and extend generally parallel thereto for somewhat less than the length of the support 10. The generally parallel walls 86, and 88 of each protrusion are joined at their lower ends by a bottom wall 90. As shown in FIG. 3, an end wall 92 depends from the horizontal wall structure 71 of base 70 and is integrally joined to the side walls 86, 88 and bottom wall 90 of each protrusion 80, 82 to close opposed ends of the open-top through or channel 85 of each protrusion.

The open-top through or channel 85 of each protrusion 80, 82 is completely filled with a suitable material 94 which inhibits collapsing of each protrusion 80, 82 when weight is placed on the top or upper side 14 of the platform support 10. Such material 94, however, should beneficially allow localized collapsing of the protrusions 80, 82 to minimize the width of the platform support 10 thereby promoting packaging of the support 10 in a computer case or the like and yet allow the protrusions 80, 82 to spring back to their original configuration to yield support to the platform structure 10 after the support 10 is removed from the confines of such carrying case or the like. In this regard, foam rubber is used as the preferred material 94 for filling the void defined by each open-top through or channel 85 of each protrusion. As will be appreciated, foam rubber is advantageously light weight and fully satisfies the other criteria mentioned above.

To enhance the aesthetic characteristics of the multilayered assembly 12, a cover 96 extends beneath and around the sides of the multilayered assembly 12. Moreover, and as shown in FIGS. 2, 3 and 6, suitable piping or binding 98 extends around the edges 18, 20, 22 and 24 of the platform support 10 and securely overlies an edge portion of the upper or top layer 30 and securely underlies both the edge of the cover 96 extending beneath the edge of the insert layer 40 extending past the base 70. In the illustrated embodiment, stitching 100 secures the piping 98 to the edge portion of the upper or top layer 30 and into operable combination with the edges of the cover 70 extending beneath the edge of the insert layer 40 extending past the base 70. Of course, securement means other than stitching 100, i.e., gluing, or ultrasonic welding, could likewise be used without detracting or departing from the spirit and scope of the present invention.

As shown, and so that cover 96 is arranged and remains in operable combination with the base 70, and the multilayered assembly 12, an exterior surface of the base 70 is preferably glued or otherwise treated such that the cover 96 adheres to and follows the contour of the base 70 and, toward the edge portion thereof, underlies and is secured to the insert layer 40. Alternatively, the cover 96 can be flame laminated to the base 70. Cover 96 is preferably formed from any durable, woven or cloth material and is preferably selected from the class of: cotton and rayon. The natural ribbing associated with the cloth or woven material forming the cover 96 and extending across the bottom or lower side 16 of the platform support 10 will naturally inhibit the support 10 from slipping and/or sliding relative to the users lap.

The support platform 10 of the present invention can further include structure 110 for elevating one end of the laptop computer C supported by the platform 10 whereby enhancing the flow of air beneath a lower side of the computer C (FIG. 4). In one from, shown in FIG. 1, structure 110 includes a pair of laterally spaced bumpers 112 and 114 extending upwardly from the upper or top layer of the multilayered assembly 12 and preferably disposed toward the rear edge 20 of the platform support 10.

Figure 7:
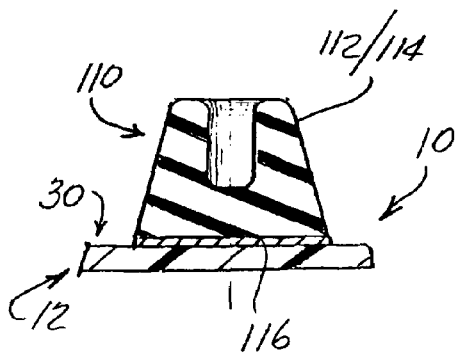
FIG. 7 is an enlarged sectional view taken along line 7-7 of FIG. 1.

Bumpers 112 and 114 of structure 110 are substantially identical relative to each other. Thus, a description of one bumper will suffice for an understanding of both. As shown in FIG. 7, each bumper preferably has a frustoconical shape and partially hollowed configuration. A bottom side 116 of each bumper is preferably adhesively secured to an upper surface of the upper layer 30 of the multilayered assembly 12. As such, and when positioned on the platform 10, the computer C is ergonomically positioned to facilitate use thereof. Moreover, and as shown in FIG. 4, when the computer C is positioned in canted relation relative to the upper side 14 of the support 10 by structure 110, air is permitted flow from and beneath a lower side of the computer. C.

Figure 8:
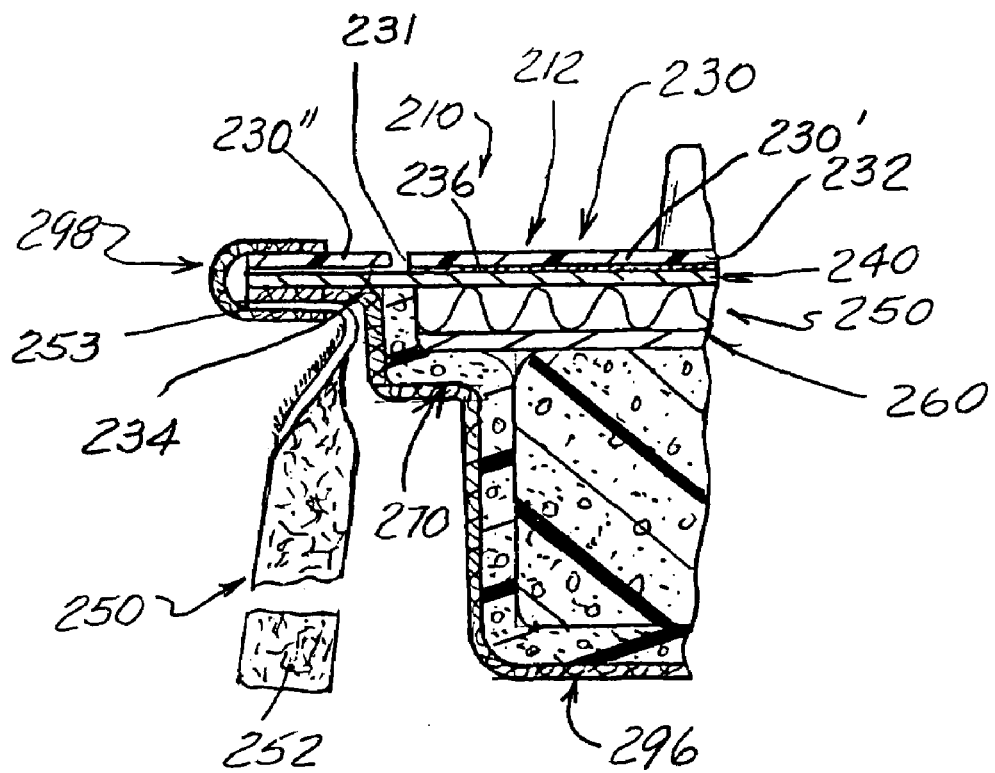
FIG. 8 is an enlarged sectional view similar to FIG. 3 showing an alternative form of the present invention.

FIG. 8 illustrates an alternative form for the platform support of the present invention. This alternative form of platform support is designated generally by reference numeral 210. The elements of this alternative platform support that are functionally analogous to those components discussed above regarding platform support 10 are designated by reference numerals identical to those listed above with the exception this embodiment uses reference numerals in the 200 series.

In the form illustrated in FIG. 8, the platform support 210 includes a multilayered assembly 212 comprised of layers 230, 240, 250, 260 and base 270 which is wrapped by a cover 296. In the embodiment shown in FIG. 8, the flexible sheet 232 forming the upper or top layer 230 is separated into two sections 230' and 230" by an elongated cutline or slice 231 which extends across the entirety of the either the width or length of the flexible sheet 232. As with the platform support design discussed above, the flexible sheet 232 and the adjacent insert layer 240 define a pocket 234 therebetween. As will be appreciated, the cutline or slice 231 in the upper layer 240 allows access to such pocket 234. As such, an additional sheet 236 having advertising or other printed indicia thereon can be inserted into the pocket 234 as through slipping such sheet 236 through the cutline or slice 234 so that such additional sheet 236 lies above the insert layer 240 to change, alter or supplement the advertising indicia on the insert layer 240.

Additionally, the platform support 210 can further include structure 250 for releasably securing wires and/or cables extending from the laptop computer C in a wrapped bundle. As shown in FIG. 8, structure 250 includes a free ended strap 252 having one end 253 secured within the piping or binding 298 extending about the edges of the platform support 210. At least a lengthwise portion of the free ended strap 252 is formed with VELCRO material on opposite sides thereof. Accordingly, and after the wires and/or cables extending from the laptop computer are passed thereacross, the free end of the strap or strip 252 is folded upon itself so as to bundle and guide the wires and/or cables extending from the laptop computer therethrough. As will be appreciated, the strap 252 could equally be designed with a form of releasable snap fitting or other suitable releasable closure whereby allowing the strap 252 to be folded and upon itself and secured without detracting or departing from this aspect of the invention.

The laptop computer support platform of the present invention allows the user of a laptop computer to remain as comfortable with their laptop computer on their lap as if the laptop computer were on a desk. That is, the rigidity afforded by the multilayered assembly 12 of the support platform 10 stabilizes the laptop computer C for ease of use. Moreover, the natural ribbing of the cloth cover 96 extending across the bottom side 16 of the platform support 10 reduces concerns over the platform support 10 slipping relative to the lap of the user thereof. Additionally, the translucent upper layer 30 permits indicia 46 to be readily apparent and viewed.

The laptop computer support platform 10 of the present invention furthermore significantly reduces heat transference between the bottom of the computer and the lap of the computer user. The multilayered assembly 12 inhibits significant heat transference between the top side 14 of the support 10 and the bottom side 16 of the support 10. More specifically, the multilayered assembly 12 is specifically provided with a thermoinsulating layer 60 of material which inhibits heat transference therepast. Moreover, and in addition to adding rigidity and stability to the platform support 10, the stiffener layer 50, especially when configured with corrugations 58, furthermore provides an air space between the upper and lower sides 14 and 16, respectively, of the support 10 to furthermore inhibit heat transference therepast.

The fore-and-aft spaced foam rubber insulated protrusions 80 and 82 extending lengthwise along the bottom side 16 of the support platform 10 furthermore add padded comfort to the underside of and allows support 10 to grip the lap of the user thereof. Because the lightweight of the platform support 10 coupled with its compressibility to less than one-inch thick readily compliments the portability required for laptop computers.

In addition to the above, the open-sided channel 84 of the platform support 10 readily allows heat, naturally entrapped between the underside of the computer and the lap of the user, to be exhausted from either side of the platform support. As such, the operating temperature of the laptop computer can be reduced to maximize computer performance. Moreover, when the computer support structure 120 is used on the upper side of the platform support 10, one end of the computer is raised to further enhance ergonomic considerations while also providing another channel between the underside of the computer and the laptop computer support platform 10 through which heat can be readily and quickly exhausted. As will be appreciated, with more air flowing under the computer laptop C, there heat dissipation is improved and there is less likelihood the laptop or notebook computer supported by platform 10 will overheat.

From the foregoing, it will be observed that numerous modifications and variations can be made and effected without departing or detracting from the true spirit and novel concept of the present invention. Moreover, it will be appreciated, the present disclosure is intended to set forth an exemplification of the invention which is not intended to limit the invention to the specific embodiment illustrated. Rather, this disclosure is intended to cover by the appended claims all such modifications and variations as fall within the spirit and scope of the claims.

What is claimed is:

1. A laptop computer support platform having a relatively flat top surface vertically spaced from a bottom surface, with said laptop computer support platform comprising:
   a base including relatively rigid and upwardly standing wall structure;
   a generally horizontal upper layer extending across and supported by the relatively rigid wall structure of said base, said upper layer being formed from a first material and defines the relatively flat top surface of said laptop computer support platform;
   a rigid, generally horizontal stiffener layer accommodated within said base in underlying supporting relation relative to said upper layer, with said stiffener layer being formed from a second material different from said first material and which is supported by the relatively rigid wall structure of said base; and
   a generally horizontal and relatively thin thermo-insulating layer accommodated within and supported by said base in layered relation relative to said upper layer and said stiffener layer, with said thermo-insulating layer being formed from a fibrous insulation material for inhibiting conductive heat transference between the top surface and bottom surface of said platform from an operating computer adapted to be supported on the top surface of said support platform.

2. The laptop computer support platform according to claim 1, wherein said support platform measures between about 0.937 inches and about 1.312 inches between the top and bottom surfaces thereof.

3. The laptop computer support platform according to claim 1, wherein about 80% to about 95% of heat imparted to the top surface of said platform by said operating computer is inhibited from being conductively transferred to the bottom surface of said support platform.

4. The laptop computer support platform according to claim 1, further including structure projecting upwardly from an upper side of said generally horizontal upper layer defining the relatively flat top surface of said support platform.

5. The laptop computer support platform according to claim 1, wherein said support platform weighs between about 10 ounces and about 15 ounces.

6. The laptop computer support platform according to claim 1, wherein said support platform has a pair of general parallel sides along with fore-and-aft spaced front and rear edges, and wherein said support platform further includes a pair of protrusions provided along a bottom of said support platform, with said protrusions being spaced in fore-and-aft relation relative to each other as to define a channel opening to the parallel sides of said support platform for promoting air flow beneath said support platform whereby dissipating heat generated by said operating computer.

7. The laptop computer support platform according to claim 1, wherein advertising indicia is visibly provided on said upper layer defining the top surface of said laptop computer support platform.

8. A laptop computer support platform having a relatively flat top surface vertically spaced from a bottom surface, with said laptop computer support platform comprising:
   a base having relatively rigid and upwardly standing wall structure;
   a multilayered assembly including a first generally horizontal layer of translucent material supported by and extending across and beyond said relatively rigid and upwardly standing wall structure of said base, with an upper side of said first layer of material defining the relatively flat top surface of said support platform, a second generally horizontal layer formed from a material different from said translucent material of said first layer, with said second layer being supported within and by said upwardly standing wall structure of said base for providing horizontal rigidity to and across a major surface area defined by said first layer of material, and a third layer for inhibiting conductive transference of heat from the top surface to the bottom surface through said support platform, said third layer including a relatively thin synthetic fibrous insulation material supported within and by said upstanding wall structure of said base and arranged in layered relation relative to said first and second layers of said multilayered assembly; and
   a cover extending across the bottom surface of said support platform.

9. The laptop computer support platform according to claim 8, wherein said translucent material extending across the top surface of said support platform is formed from a colored synthetic material.

10. The laptop computer support platform according to claim 8, wherein said support platform further includes a pair of spaced and generally parallel protrusions extending beneath said multilayered assembly and across said support platform to define a channel between said protrusions, with said channel opening to opposed sides of said support platform for directing air beneath and thereby promoting dissipation of heat away from said support platform.

11. The laptop computer support platform according to claim 8, further including structure projecting upwardly from the upper side of said first layer thereby providing space between the top surface of said support platform and a portion of an underside of a computer supported thereon.

12. The laptop computer support platform according to claim 8, wherein the cover extending across the bottom surface of said support platform is fabricated from a woven material.

13. The laptop computer support platform according to claim 8, wherein said support platform measures between about 0.937 inches and about 1.312 inches between the top and bottom surfaces thereof.

14. A laptop computer support platform having a relatively flat top surface vertically spaced from a bottom surface, with said laptop computer support platform comprising:
- a base including relatively rigid and upwardly standing wall structure, with said rigid and upwardly standing wall structure having a stepped configuration arranged adjacent to an upper edge thereof;
- a generally horizontal upper layer extending across and supported by the relatively rigid and upwardly standing wall structure of said base, and wherein said upper layer is formed from a translucent material whose top surface defines the relatively flat top surface of said laptop computer support platform;
- a rigid, generally horizontal stiffener layer arranged in underlying supporting relation relative to said upper layer and supported by the stepped configuration formed in said base, with said stiffener layer being formed from a second material different from said first material;
- a generally horizontal and relatively thin thermo-insulating layer arranged in layered relation relative to said upper layer and said stiffener layer, with said thermo-insulating layer being positioned relative to said stiffener layer and supported by the stepped configuration formed in the rigid and upwardly standing wall structure of said base, with said thermo-insulating layer being formed from a fibrous insulation material for inhibiting conductive heat transfer between the top surface and bottom surface of said platform; and
- a cover extending beneath said base and across the bottom surface of said support platform, upwardly in overlying relation relative to the upstanding wall structure of said base, and secured around outer edges of the upper layer of material.

15. The laptop computer support platform according to claim 14, wherein said base is formed from a cross-linked foam material.

16. The laptop computer support platform according to claim 14, wherein said stiffener layer is formed with non-metallic spaced upper and lower layers of material secured to an intermediary layer of corrugated material.

17. The laptop computer support platform according to claim 14, wherein said cover is fabricated from a woven material.

18. The laptop computer support platform according to claim 14, wherein said support platform further includes a pair of spaced generally parallel legs defining an open-bottom channel therebetween, with said channel opening to opposed sides of said support platform to promote dissipation of heat away from said support platform.

19. The laptop computer support platform according to claim 14, further including structure secured to and projecting upwardly from the top surface of said layer of translucent material thereby providing space between a top side of said support platform and a portion of an underside of a computer supported thereon.

\* \* \* \* \*